(12) United States Patent
Attili et al.

(10) Patent No.: US 7,287,032 B2
(45) Date of Patent: Oct. 23, 2007

(54) DISPLAY OF HIERARCHICAL DATA WITH NON-NUMERIC MEASURES

(75) Inventors: Srinivas Attili, Sterling, VA (US); Ajay A. Divekar, Fairfax, VA (US); Srinivas Jujjuru, Vienna, VA (US)

(73) Assignee: International Business Machines Corporation, Armonk, NY (US)

( * ) Notice: Subject to any disclaimer, the term of this patent is extended or adjusted under 35 U.S.C. 154(b) by 513 days.

(21) Appl. No.: 10/915,888

(22) Filed: Aug. 10, 2004

(65) Prior Publication Data
US 2006/0036613 A1 Feb. 16, 2006

(51) Int. Cl.
G06F 17/00 (2006.01)

(52) U.S. Cl. .................. 707/100; 707/102

(58) Field of Classification Search .......... None
See application file for complete search history.

(56) References Cited

U.S. PATENT DOCUMENTS

| | | | |
|---|---|---|---|
| 5,953,724 A * | 9/1999 | Lowry | 707/102 |
| 5,978,788 A | 11/1999 | Castelli et al. | |
| 6,128,617 A * | 10/2000 | Lowry | 707/100 |
| 6,490,600 B1 | 12/2002 | McGarry | |
| 6,636,870 B2 | 10/2003 | Roccaforte | |
| 6,658,413 B1 | 12/2003 | Reddy et al. | |
| 6,775,675 B1 * | 8/2004 | Nwabueze et al. | 707/100 |
| 6,831,668 B2 * | 12/2004 | Cras et al. | 715/853 |
| 2002/0191605 A1 | 12/2002 | Lunteren et al. | |
| 2003/0126143 A1 | 7/2003 | Roussopoulos et al. | |
| 2003/0208506 A1 | 11/2003 | Greenfield et al. | |
| 2004/0093412 A1 | 5/2004 | Chen et al. | |
| 2005/0038768 A1 * | 2/2005 | Morris | 707/1 |

* cited by examiner

Primary Examiner—John Breene
Assistant Examiner—Thu-Nguyet Le
(74) Attorney, Agent, or Firm—Schmeiser, Olson & Watts; John R. Pivnichny

(57) ABSTRACT

A method, computer system, and computer program product for displaying hierarchical data. Entities E1, E2, and E3 are provided, wherein E1 is a first hierarchy of linked data items, E2 is a second hierarchy of linked data items, and E3 is a third hierarchy of linked data items or a flat vector of data items. The data items in E1, E2, and E3 are non-numeric data items. T1, T2, and T3 are each selected from E1, E2, and E3 such that T1, T2, and T3 are different from one another. An orthogonal table structure is displayed. The orthogonal table structure includes row structure S1, column structure S2, and array structure S3. S1 is derived from T1, S2 is derived from T2, and S3 is derived from T3 or is unassigned.

3 Claims, 14 Drawing Sheets

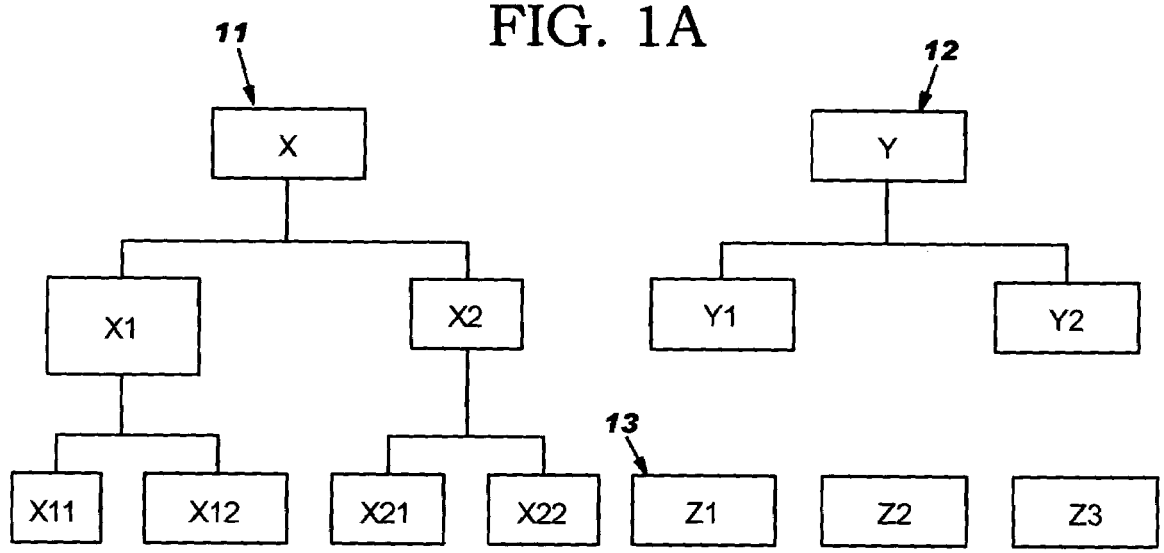

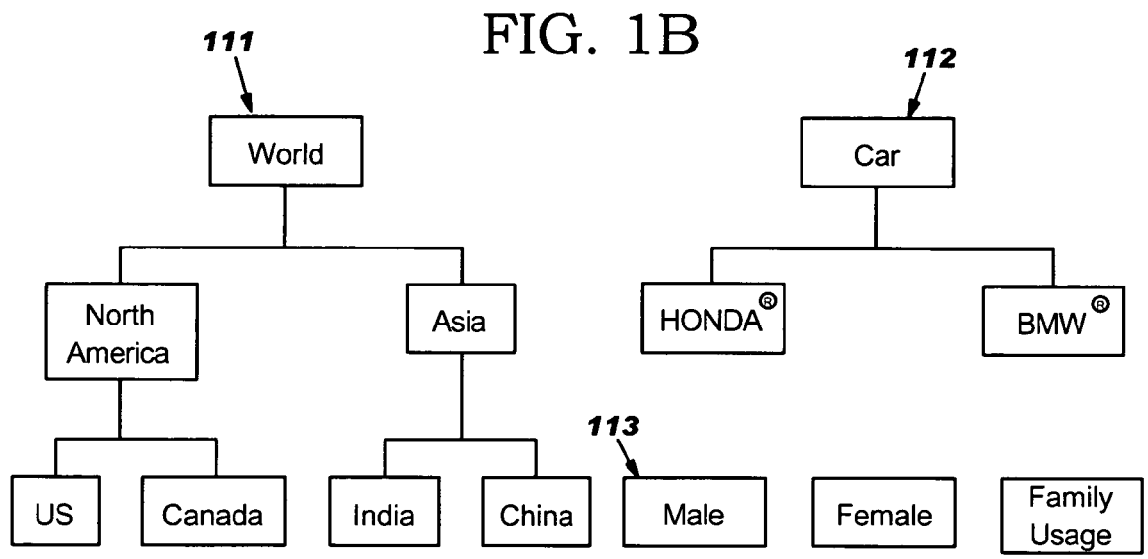

FIG. 4A

| | | | Y | | |
|---|---|---|---|---|---|
| | | 30↓ 21→ | Y1 | Y2 | ☐ 29 31→ |
| X | X1 | X11 | .. *33* | .. *40* | |
| | | X12 | .. *34* | .. *39* | |
| | X2 | X21 | .. *35* | .. *38* | |
| | | X22 | .. *36* | .. *37* | |
| | | ☐ 28 | | | |

| | | 21 | Y | | 29 |
|---|---|---|---|---|---|
| | 20↓ | | Y1 | Y2 | ☐ 22→ |
| X | X1 | | Z3 .. *23* | .. *25* | |
| | X2 | | .. *24* | .. *26* | |
| | ☐ ☐ | | | | |
| | 28 27 | | | | |

FIG. 4B

| 130 ↓ | 121 → | | Car | | 129 |
|---|---|---|---|---|---|
| | | | HONDA® | BMW® | |
| World | North America | US | .. 133 | .. 140 | 131 |
| | | Canada | .. 134 | .. 139 | |
| | Asia | India | .. 135 | .. 138 | |
| | | China | .. 136 | .. 137 | |
| | 128 | | | | |

FIG. 5B

113 → ☐ Male  ☐ Female  ☐ Family Usage

FIG. 6B

| 130 ↓ | 121 → | Car | | 129 |
|---|---|---|---|---|
| | | HONDA® | BMW® | |
| World | North America | Family Usage 123 | .. 125 | 122 |
| | Asia | .. 124 | .. 126 | |
| | 128  129 | | | |

| 130 | | 121 → | Car | | 129 |
|---|---|---|---|---|---|
| | | | HONDA® | BMW® | |
| World | North America | US | [..] | [..] | |
| | | Canada | [..] | [..] | |
| | Asia | India | [..] | Female [..] — 138 | |
| | | China | [..] | Male [..] — 137 | |
| | | 128 | | | |

FIG. 8B

| 120 | | 121 → | Car | | 129 |
|---|---|---|---|---|---|
| | | | HONDA® | BMW® | |
| World | North America | Family Usage 123 [..] | 125 [..] | | |
| | Asia | [..] 124 | Male, Female 126 — 142 | | |
| | | 128  127 | | | |

| 120 | | Car | | 129 |
|---|---|---|---|---|
| World | North America | Family Usage  146 | | 143 |
| | Asia | Male, Female | | 142 |
| | 127  128 | | | |

FIG. 10B

| 121 | Car | | | 129 |
|---|---|---|---|---|
| | HONDA® | BMW® | | |
| World | Family Usage  147 | Male, Female | | 142 |
| 127 | 144 | | | |

FIG. 11B

| | Car | | 117 |
|---|---|---|---|
| World | Family Usage, Male, Female  148 | | |
| 127 | | | 145 |

FIG. 12A

| 51→ | Y 52 | 58 ⊞ |
|---|---|---|
| Z1 | X22 🔒—53 | |
| Z2 | X21 🔒—54 | |
| Z3 | X1 🔒—55 | |

| 56 | Y | | 59 |
|---|---|---|---|
| | Y1 | Y2 | 🔒 |
| Z1 | [..] | X22 [..] | |
| Z2 | [..] | X21 [..] | |
| Z3 | X1 [..] | [..] | |

| 61 | X 62 | 68 ⊞ |
|---|---|---|
| Z1 | Y2 🔒 63 | |
| Z2 | Y2 🔒 64 | |
| Z3 | Y1 🔒 65 | |

| | Car | |
|---|---|---|
| Male | China  *153* | ⊞ *158* |
| Female | India  *154* | |
| Family Usage | North America  *155* | |

| | Car | |
|---|---|---|
| | HONDA® | BMW®  ⊟ *159* |
| Male | [..] | China [..] |
| Female | [..] | India [..] |
| Family Usage | North America [..] | |

| | World | |
|---|---|---|
| Male | BMW® 🔒 | *163* |
| Female | BMW® 🔒 | *164* |
| Family Usage | HONDA® 🔒 | *165* |

*150*  *161*  *162*  *168* ⊞

|  | World | |
|---|---|---|
|  | North America | Asia |
| Male | [..] | BMW® 🔒 |
| Female | [..] | BMW® 🔒 |
| Family Usage | HONDA® [..] | [..] |

|  | World | | | |
|---|---|---|---|---|
|  | North America | | Asia | |
|  | US | Canada | India | China |
| Male | [..] | [..] | [..] | BMW® [..] |
| Female | [..] | [..] | BMW® [..] | [..] |
| Family Usage | [..] | [..] | [..] | [..] |

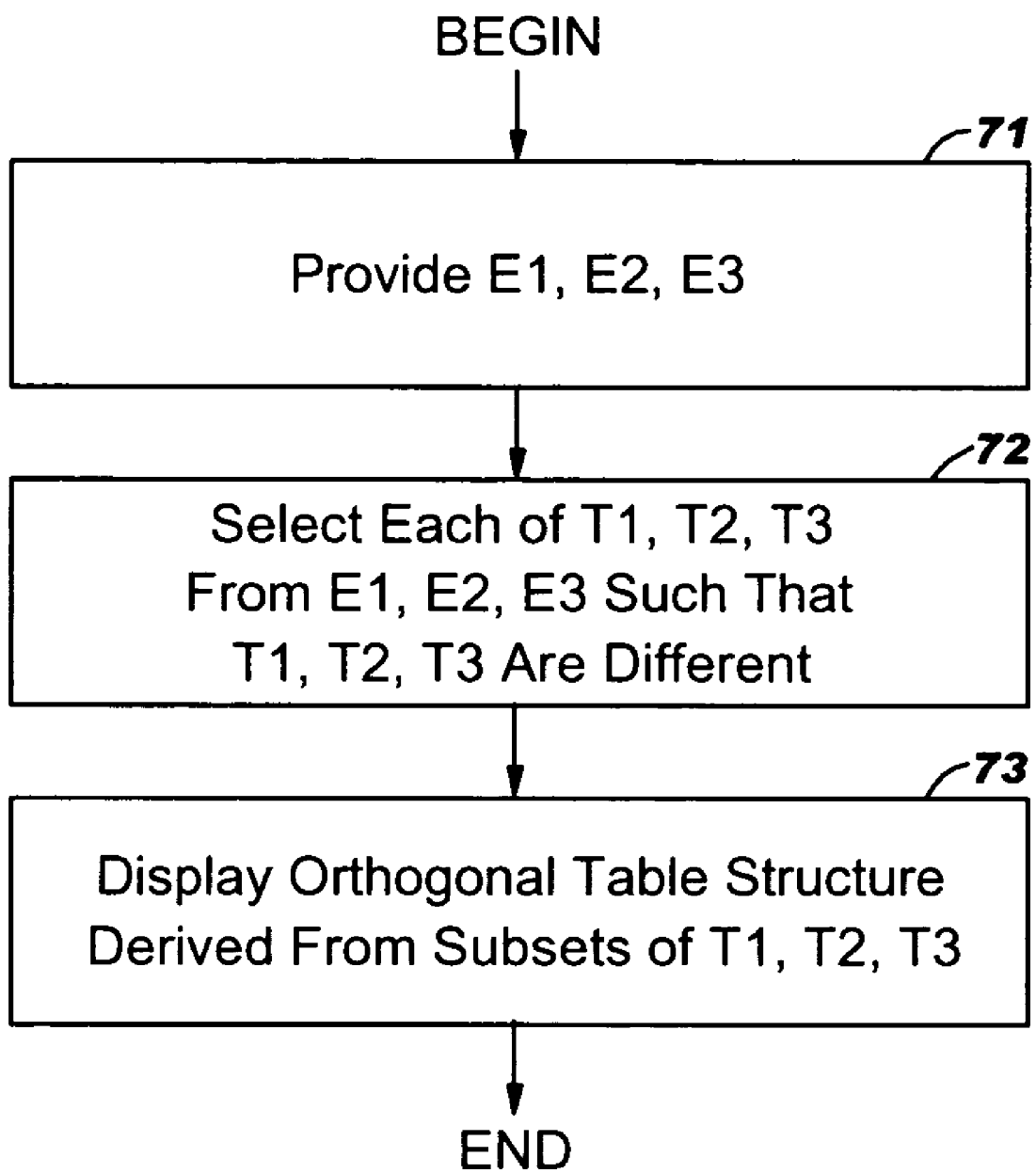

DISPLAY OF HIERARCHICAL DATA WITH NON-NUMERIC MEASURES

BACKGROUND OF THE INVENTION

1. Technical Field

The present invention relates to a method, computer system, and computer program product for displaying hierarchical data.

2. Related Art

Currently available business intelligence products such as Online Analytical Processing (OLAP) have limited capabilities for displaying hierarchical data. Thus, there is a need for a method of displaying hierarchical data more flexibly that currently exists in the related art.

SUMMARY OF THE INVENTION

The present invention provides a method for displaying hierarchical data, comprising:

providing E1, E2, and E3, E1 being a first hierarchy of linked data items, E2 being a second hierarchy of linked data items, and E3 being a third hierarchy of linked data items or a flat vector of data items, said data items in E1, E2, and E3 being non-numeric data items;

selecting T1, T2, and T3 each from the group consisting of E1, E2, and E3 such that T1, T2, and T3 are different from one another; and displaying an orthogonal table structure comprising a row structure S1, a column structure S2, and an array structure S3, said S1 being derived from T1, said S2 being derived from T2, said S3 being derived from T3 or being unassigned The present invention provides a computer system comprising a processor and a computer readable memory unit coupled to the processor, said memory unit containing instructions that when executed by the processor implement a method for displaying hierarchical data, said method comprising the computer implemented steps of:

selecting T1, T2, and T3 each from the group consisting of E1, E2, and E3 such that T1, T2, and T3 are different from one another, said E1 being a first hierarchy of linked data items, said E2 being a second hierarchy of linked data items, said E3 being a third hierarchy of linked data items or a flat vector of data items, said linked data items in at least one of E1, E2, and E3 consisting of non-numeric data items; and displaying an orthogonal table structure comprising a row structure S1, a column structure S2, and an array structure S3, said S1 being derived from T1, said S2 being derived from T2, said S3 being derived from T3 or being unassigned.

The present invention provides a computer program product, comprising a computer usable medium having a computer readable program code embodied therein, said computer readable program code comprising an algorithm adapted to implement a method for displaying hierarchical data, said method comprising the steps of:

selecting T1, T2, and T3 each from the group consisting of E1, E2, and E3 such that T1, T2, and T3 are different from one another, said E1 being a first hierarchy of linked data items, said E2 being a second hierarchy of linked data items, said E3 being a third hierarchy of linked data items or a flat vector of data items, said linked data items in at least one of E1, E2, and E3 consisting of non-numeric data items; and displaying an orthogonal table structure comprising a row structure S1, a column structure S2, and an array structure S3, said S1 being derived from T1, said S2 being derived from T2, said S3 being derived from T3 or being unassigned.

The present invention advantageously provides a method of displaying hierarchical data more flexibly that currently exists in the related art.

BRIEF DESCRIPTION OF THE DRAWINGS

FIGS. 1A-17A comprise displays of hierarchical data in terms of a generic example of embodiments of the present invention.

FIGS. 1B-17B comprise displays of hierarchical data in terms of a specific example representing a special case of the generic example of FIGS. 1A-17A.

FIG. 18 is a flow chart describing a method for displaying hierarchical data, in accordance with embodiments of the present invention.

DETAILED DESCRIPTION OF THE INVENTION

Figure 15A:
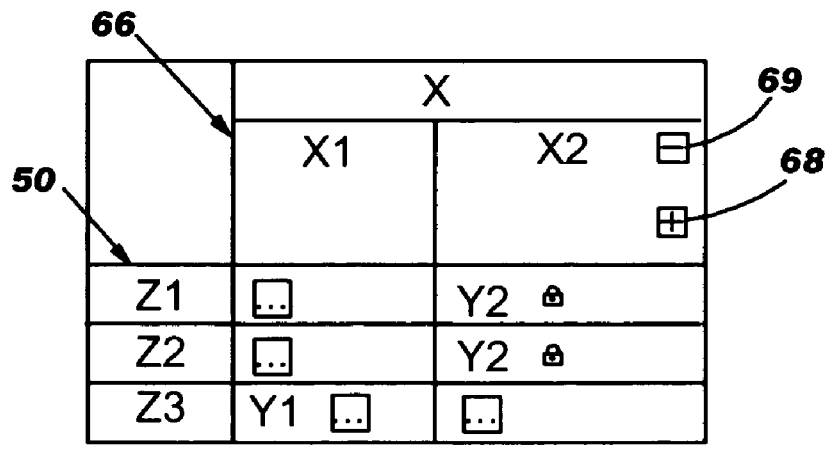

The detailed description comprises a generic example of embodiments of the present invention, a specific example representing a special case of the generic example, and a general description of the present invention.

Generic Example of Embodiments of the Present Invention

FIGS. 1A-17A comprise displays of hierarchical data in terms of a generic example of embodiments of the present invention. FIG. 1A depicts a first hierarchy 11 of linked non-numeric data items, a second hierarchy 12 of linked non-numeric data items, and a flat vector 13 of non-numeric data items. A flat vector is a one-dimensional array of data items which are not linked hierarchically to one another. A data item is a single datum (e.g., "ABC") or a plurality of datum expressed together (e.g., "ABC,DEF,GHI" or "ABC-DEF-GHI" or "ABC DEF GHI", etc.). A non-numeric data item comprises a datum or data that cannot be manipulated by an arithmetic or mathematical operator. Thus a non-numeric data item cannot be added, subtracted, multiplied, divided, exponentiated, etc. A non-numeric data item may be, inter alia, a character string and may thus be manipulated by any non-arithmetic operator that manipulates character strings. For example, a first non-numeric data item that is a character string may be appended, by a concatenation operator, to a second non-numeric data item that is a character string.

In FIG. 1A, the first hierarchy 11 has three levels, wherein the first level comprises X, wherein the second level below X comprises X1 and X2, wherein the third level below X1 comprises X11 and X12, and wherein the third level below X2 comprises X21 and X22. The second hierarchy 12 has two levels, wherein the first level comprises Y, and wherein the second level below Y comprises Y1 and Y2. The flat vector 13 comprises three data items, namely Z1, Z2, and Z3.

The first hierarchy 11 with the data values for the data items (X, X1, X1, X2, X11, X12, X21, X22), the second hierarchy 12 with the data values for the data items (Y, Y1, Y2), and the flat vector 13 with the data values for the data items (Z1, Z2, Z3), may be predefined or predetermined prior to the display of the orthogonal data structures in FIGS. 2A-17A.

A hierarchy may be traversed downward or upward. For example, the first hierarchy 11 may be traversed downward from X to X1 to X11, wherein the traversal from X to X1 to X11 is said to be a traversal from a first level to a second level to a third level. The traversal from X to X1 is said to be a traversal to a next level downward. As another example, the first hierarchy 11 may be traversed upward from X11 to X1 to X wherein the traversal from X11 to X1 to X is said to be a traversal from a third level to a second level to a first level. The traversal from X1 to X is said to be a traversal to a next level upward.

Each complete downward traversal through the first hierarchy 11 defines a linear path of the first hierarchy 11. Thus the first hierarchy 11 has a first linear path (X, X1, X11), a second linear path (X, X1, X12), a third linear path (X, X2, X21), and a fourth linear path (X, X2, X22).

Each complete downward traversal through the second hierarchy 12 defines a linear path of the second hierarchy 12. Thus the second hierarchy 12 has a first linear path (Y, Y1) and a second linear path (Y, Y2).

FIGS. 2A-17A display (e.g., on a computer screen) an orthogonal table structure having data therein derived from the first hierarchy 11, the second hierarchy 12, and the flat vector 13 of FIG. 1A. An orthogonal table structure has the general form shown in Table 1 in terms of a row structure R, a column structure C, and an array structure A.

TABLE 1

|   | C |
|---|---|
| R | A |

The row structure R is a set of rows, either hierarchically organized in relation to the first hierarchy 11 in FIGS. 2A-11A, or organized as a flat set of rows representing the flat vector 13 in FIGS. 12A-17A.

The column structure C is a set of columns, either hierarchically organized in relation to the second hierarchy 12 in FIGS. 2A-13A, or hierarchically organized as a subset of the first hierarchy 11 in FIGS. 15A-17A.

The array structure A is an array of cells having data items therein which correlate with a linear path of R and with a linear path of C. Thus, the data items in a cell of the array structure A is a "measure" or "value" of the combination of a linear path of R and a linear path of C. Each cell of A is disposed at an intersection of the linear path of R and the linear path of C as will be illustrated and described infra. The measures or values in the cells of array structure A are derived: from the flat vector 13 in FIGS. 2A-11A; from the first hierarchy 11 in FIGS. 12A-13A; or from the second hierarchy 12 in FIGS. 14A-17A.

The row structure R, the column structure C, and the array structure A are selected and/or determined prior to the display of the orthogonal data structures in FIGS. 2A-17A.

FIG. 2A is a display of an orthogonal table structure in which the row structure is X, the column structure is Y (see FIG. 1A for X and Y), and the array structure comprises one empty cell 18 that is assignable. An "empty" cell is a cell having no data item therein. An "assignable" cell is denoted by the "assignment icon" therein. Thus, the cell 18 has the assignment icon 19 therein. An assignable cell may be an empty cell in which a data item may be inserted, or a filled cell for which a data item therein may be replaced by another data item. A "filled" cell is a cell having a data item therein.

In FIG. 2A, the drilldown icon 27 may be selected to drill down the row structure X to a next level downward, and the drilldown icon 17 may be selected to drill down the column structure Y to a next level downward.

If the drilldown icons 27 and 17 are both selected (e.g., by clicking a left button of a mouse), then the row structure (X) and column structure (Y) are drilled down to a next level that includes X1, X2 and Y1, Y2, respectively (see FIG. 1A for definitions of X, X1, X2, Y, Y1, Y2), as shown in FIG. 3A. Thus FIG. 3A shows the row structure 20 (X, X1, X2), the column structure 21 (Y, Y1, Y2), and the array structure 22 comprising cells 23-26, wherein each cell of cells 23-26 is an empty assignable cell having an assignment icon therein. The cell 23 is disposed at an intersection of linear path (X, X1) of the row structure 20 and the linear path (Y, Y1) of the column structure 21. The cell 24 is disposed at an intersection of linear path (X,X2) of the row structure 20 and the linear path (Y, Y1) of the column structure 21. The cell 25 is disposed at an intersection of linear path (X, X1) of the row structure 20 and the linear path (Y, Y2) of the column structure 21. The cell 26 is disposed at an intersection of linear path (X,X2) of the row structure 20 and the linear path (Y, Y2) of the column structure 21.

In FIG. 3A, the drilldown icon 27 may be selected to drill down the row structure 20 to a next level downward, the rollup icon 28 may be selected to roll up the row structure 20 one level upward, and the rollup icon 29 may be selected to roll up the column structure 21 one level upward. If in FIG. 3A, the rollup icons 28 and 29 were both selected, then FIG. 2A would result. If in FIG. 3A the drilldown icon 27 is selected, then the row structure 20 is drilled down to a third level that adds X11, X12, X21, X22 as shown in FIG. 4A.

FIG. 4A depicts the row structure 30, the column structure 21, and the array structure 31. The row structure 30 comprises the four linear branches of: (X, X1, X11), X, X1, X12), (X, X2, X21), and (X, X2, X22). The column structure 22 comprises the two linear branches (Y,Y1) and (Y, Y2). The array structure 31 comprises 8 cells 33-40, each such cell being an empty cell with the assignment operator therein, said 8 cells 33-40 being disposed at the intersections of the four linear branches of the row structure 30 and the two linear branches of the column structure 21.

If in FIG. 3A the assignment icon in cell 23 is selected (e.g., by a user), then the flat vector 13 of FIG. 1A is displayed, as shown in FIG. 5A, for the purpose of assigning a data item to cell 23. The data item may be selected from: Z1, Z2, and Z3. If Z3 is selected, then Z3 is inserted into cell 23 of FIG. 3A resulting in FIG. 6A., wherein the data item Z3 appears in cell 23 of FIG. 6A. An assignment icon also appears in cell 23 of FIG. 6A, because a user may select this assignment operator to change the data item in cell 23 to another data item (i.e., to Z1 or Z2). Note that the assignment of data item Z3 to cell 23 in FIG. 6A occurs at a row level 2 (i.e., at X1) and at a column level 2 (i.e, at Y1).

Similarly, the user may select assignment icons 37 and 38 of FIG. 4A for subsequently selecting Z1 and Z2 from the display of the flat vector 13 of FIG. 5A for insertion into cell 37 and 38, respectively, as shown in FIG. 7A. The assignment of data item Z1 to cell 37 occurs at a row level 3 (i.e., at X22) and at a column level 2 (i.e, at Y2). The assignment of data item Z2 to cell 38 occurs at a row level 3 (i.e., at X21) and at a column level 2 (i.e, at Y2). Cells 37 and 38 in FIG. 7A each comprise an assignment icon for replacing Z1 and Z2, respectively, with data values selected from Z1, Z2, and Z3.

A cell of an array structure 31 of FIG. 4A or FIG. 7A is "assigned" if the cell has a data item therein. A cell of the array structure 31 is "assignable" if either the cell is empty and may have a data item assigned thereto or the cell is assigned with an existing data item therein such that a new data item may be selected to replace the existing data item in the cell. Thus a cell may be both assigned and assignable. The array structure 31 is assigned in the flat vector 13 if at least one cell thereof is assigned with a data item selected from the flat vector 13. The array structure 31 is assignable in the flat vector 13 if at least one cell thereof is assignable with a data item selected from the flat vector 13.

If in FIG. 7A, the rollup icon 28 is selected, then the row structure 30 will be rolled up to the next level 2 showing the row structure 20 in FIG. 8A. Note that the data items Z1 and Z2 in cells 37 and 38, respectively, of FIG. 7A appear together as a data item Z1, Z2 in cell 26 of FIG. 8A together with a lock icon 42. The lock icon 42 denotes that cell 26 is "locked", meaning that the data items Z1, Z2 therein cannot be changed because the data items Z1, Z2 were assigned in a lower level in cells 37 and 38 (i.e., in row level 3 as explained supra). The lock icon 42 resulting from the rollup to FIG. 8A from FIG. 7A is in recognition of the fact that the assignment of Z1 and Z2 at the lower level creates an ambiguity in the display of FIG. 8A as to the specific cells (i.e., cells 37 and 38) in which the data items Z1 and Z2 are located, because lower level cells 37 and 38 do not appear in FIG. 8A. Thus the lock 42 prevents reassignment of the data items in cell 26 in FIG. 8A. A cell having a lock icon therein, or a data item having a lock icon adjacent thereto, is said to be "locked". Thus in FIG. 8A cell 26 and data items Z1, Z2 are locked.

The row structure 20 in FIG. 8A may be drilled down by selecting the drilldown icon 27 (e.g., by left-clicking a mouse on the drilldown icon 27), resulting in the orthogonal data structure of FIG. 7A in which the lock 42 does not appear.

Figures 9A, 10A, 11A:
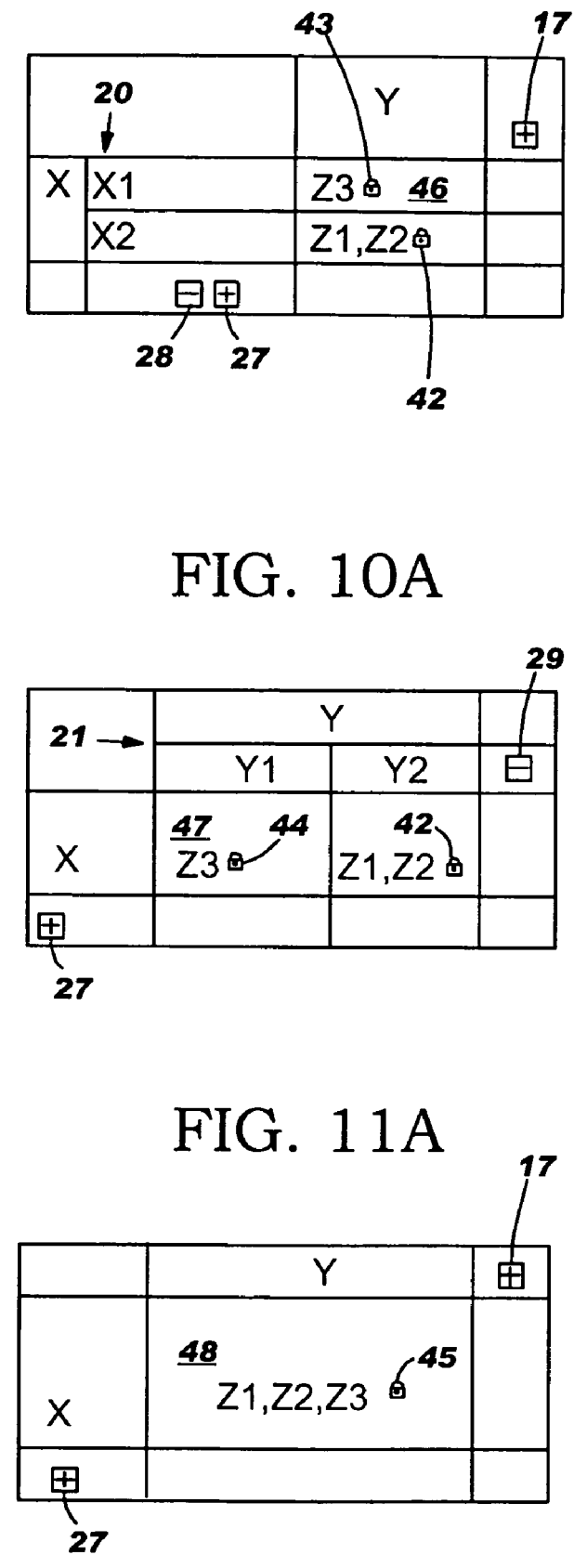

If in FIG. 8A the rollup icon 29 is selected, then the column structure 21 will be rolled up to the next level (1) in which only Y appears in the column structure, as shown in FIG. 9A. FIG. 9A also shows a lock icon 43 in the cell 46, so that the data item Z3 therein cannot be changed because the data item Z3 was assigned in a lower level (i.e., column level 2) in cell 23 of FIG. 6A.

If in FIG. 9A the rollup icon 28 is selected, then the row structure 20 will be rolled up to the next level (1) in which only X appears in the row structure, as shown in FIG. 10A. FIG. 10A also shows a lock icon 44 in the cell 47, so that the data item Z3 therein cannot be changed because the data item Z3 was assigned in a lower level (i.e., row level 3) in cell 23 of FIG. 6A.

If in FIG. 10A the rollup icon 29 is selected, then the column structure 21 will be rolled up to the next level (1) in which only Y appears in the column structure, as shown in FIG. 11A. FIG. 11A also shows a lock icon 45 in the cell 48, so that the data item Z1, Z2, Z3 therein cannot be changed because Z1 and Z2 and Z3 of the data item Z1, Z2, Z3 were each assigned in a lower level as explained supra.

Figure 16A:
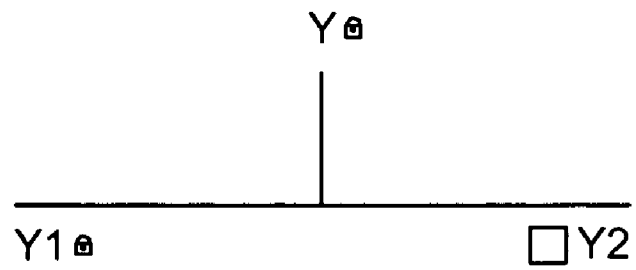
Figure 17A:
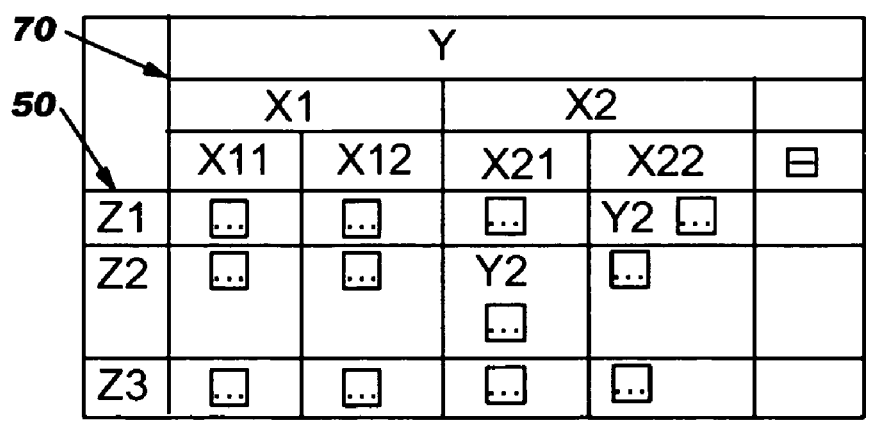

FIGS. 12A-17A show orthogonal data structures in which the row structure is the flat vector 13 of FIG. 1A. In FIGS. 12A-13A, the column structure is the second hierarchy 12 of FIG. 1A, and the array structure is the first hierarchy 11 of FIG. 1A. In FIGS. 14A, 15A, and 17A, the column structure is the first hierarchy 11 of FIG. 1A, and the array structure is the second hierarchy 12 of FIG. 1A. Since the vector 13 is a flat vector and not a hierarchy, there is no drilling down or rolling up in the row structure of FIGS. 12A-17A. However, drilling down and/or rolling up may occur in the column structure of FIGS. 12A-17A.

In FIG. 12A, the row structure 50 comprises the flat vector 13 (Z1, Z2, Z3), the column structure 51 comprises the data item Y, and the array structure 52 comprises the data items X22, X21, and X1 in cells 53, 54, and 55 at the intersection of Y with Z1, Z2, and Z3, respectively. Cells 53-55 are each locked, because the data items X22, X21, and X1 were respectively coupled to Z1, Z2, and Z3 at a lower level as explained supra in conjunction with a transition from FIG. 3A to FIG. 6A for Z3, and a transition from FIG. 4A to FIG. 7A for Z1, Z2.

If the drilldown icon 58 in FIG. 12A is selected, then the column structure 51 is drilled down to column level 2 (Y1, Y2), which is shown as column structure 56 in FIG. 13A. If the rollup icon 59 in FIG. 13A is selected, then a rollup of the column structure 56 results in FIG. 12A. The lock icons in cells 53-55 of FIG. 12A do not appear in FIG. 13A, because in FIG. 13A the data items X22, X21, and X are at the level in which they were defined and are therefore placed in the same cell in which they were initially placed.

In FIG. 14A, the row structure 50 comprises the flat vector 13 (Z1, Z2, Z3), the column structure 61 comprises the data item X, and the array structure 62 comprises the data items Y2, Y2, and Y1 in cells 63, 64, and 65 at the intersection of X with Z1, Z2, and Z3, respectively. Cells 63-65 are each locked, because the data items Y2, Y2, and Y1 were respectively coupled to Z1, Z2, and Z3 at a lower level as explained supra in conjunction with a transition from FIG. 3A to FIG. 6A for Z3, and a transition from FIG. 4A to FIG. 7A for Z1, Z2.

If the drilldown icon 68 in FIG. 14A is selected, then the column structure 61 is drilled down to column level 2 (X1, X2), which is shown as column structure 66 in FIG. 15A. If the rollup icon 69 in FIG. 15A is selected, then a rollup of the column structure 66 results in FIG. 14A.

If any assignment icon in FIG. 15A is selected, then the second hierarchy 12 (i.e., linear paths Y,Y1 and Y,Y2) is displayed as shown in FIG. 16A. In FIG. 16A, Y1 is locked because an assignment of Y1 to the intersection of (Z1 and X1), (Z2 and X1), or (Z3 and X2) is inconsistent with the assignments of Z3 to the intersection of X1 and Y1 in FIG. 8A. In FIG. 16A, Y is locked because there is an assignment of a level below Y, namely Y2 as shown in FIG. 15A.

If the drilldown icon 68 in FIG. 15A is selected, then the column structure 66 is drilled down to column structure 70 shown in FIG. 17A. The lock icons appearing in FIG. 15A do not appear in FIG. 17A, because in FIG. 17A the data item Y2 is at a level in which Z1 and Z2 were initially defined in FIG. 7A at the intersection of (X22 and Y2) and (X21 and Y2), respectively.

The orthogonal table structures in FIGS. 2A-17A are shown as being displayed in a read/write mode in which a user has both read and write permission. The write permission comprises permission to add or change values in the array structure of the orthogonal table structure. In the read/write mode, the assignment icon and the lock icon appear in cells as described supra. The orthogonal table structures may alternatively be displayed in a read-only mode which a user has read permission only and does not have write permission. In the read-only mode, the assignment icon and the lock icon do not appear since the assignment and lock icons facilitate or identify cells which can or cannot be written to, which is irrelevant for the read-only mode. However, drilling down and rolling up are permissible in the read-only mode, so that the drilldown and rollup icons appear in the read-only mode.

Special Case of Generic Example of Embodiments of the Present Invention FIGS. 1B-17B comprise displays of hierarchical data in terms of a specific example representing a special case of the generic example described supra in conjunction with FIGS. 1A-17A, respectively. FIG. 1B depicts a first hierarchy 111 of linked non-numeric data items, a second hierarchy 112 of linked non-numeric data items, and a flat vector 113 of non-numeric data items.

In FIG. 1B, the first hierarchy 111 has three levels, wherein the first level comprises World, wherein the second level below World comprises North America and Asia, wherein the third level below North America comprises US and Canada, and wherein the third level below Asia comprises India and China. The second hierarchy 112 has two levels, wherein the first level comprises Car, and wherein the second level below Car comprises HONDA® and BMW®. The flat vector 113 comprises three data items, namely Male, Female, and Family Usage. The data items Male, Female, and Family Use pertain to the dominant usage of a Car (i.e., HONDA® or BMW®) being by Males, Females, and Family, respectively.

The first hierarchy 111 of FIG. 1B is a special case of the first hierarchy 11 of FIG. 1A, wherein data items X, X1, X2, X11, X12, X21, and X22 of the first hierarchy 11 of FIG. 1A are respectively represented by data items World, North America, Asia, US, Canada, India, and China of the first hierarchy 111 of FIG. 1B.

The second hierarchy 112 of FIG. 1B is a special case of the second hierarchy 12 of FIG. 1A, wherein data items Y, Y1, and Y2 of the second hierarchy 12 of FIG. 1A are respectively represented by data items Car, HONDA®, and BMW® of the second hierarchy 112 of FIG. 1B.

The flat vector 113 of FIG. 1B is a special case of the flat vector 13 of FIG. 1A, wherein data items Z1, Z2, and Z3 of the flat vector 13 of FIG. 1A are respectively represented by data items Male, Female, and Family Usage of the he flat vector 113 of FIG. 1B.

The first hierarchy 111 with the data values for the data items (World, North America, North America, Asia, US, Canada, India, China), the second hierarchy 112 with the data values for the data items (Car, HONDA®, BMW®), and the flat vector 113 with the data values for the data items (Male, Female, Family Usage), may be predefined or predetermined prior to the display of the orthogonal data structures in FIGS. 2B-17B.

FIGS. 2B-17B display (e.g., on a computer screen) an orthogonal table structure having data therein derived from the first hierarchy 111, the second hierarchy 112, and the flat vector 113 of FIG. 1B. The row structure, the column structure, and the array structure of the orthogonal table structure are selected and/or determined prior to the display of the orthogonal data structures in FIGS. 2B-17B.

FIG. 2B is a display of an orthogonal table structure in which the row structure is World, the column structure is Car (see FIG. 1B for World and Car), and the array structure comprises one empty cell 118 that is assignable. In FIG. 2B, the drilldown icon 116 may be selected to drill down the row structure World to a next level downward, and the drilldown icon 117 may be selected to drill down the column structure Car to a next level downward.

If the drilldown icons 127 and 117 are both selected (e.g., by clicking a left button of a mouse), then the row structure (World) and column structure (Car) are drilled down to a next level that includes North America, Asia and HONDA®, BMW®, respectively (see FIG. 1B for definitions of World, North America, Asia, Car, HONDA®, BMW®), as shown in FIG. 3B. Thus FIG. 3B shows the row structure 120 (World, North America, Asia), the column structure 121 (Car, HONDA®, BMW®), and the array structure 122 comprising cells 123-126, wherein each cell of cells 123-126 is an empty assignable cell having an assignment icon therein. The cell 123 is disposed at an intersection of linear path (World, North America) of the row structure 120 and the linear path (Car, HONDA®) of the column structure 121. The cell 124 is disposed at an intersection of linear path (World, Asia) of the row structure 120 and the linear path (Car, HONDA®) of the column structure 121. The cell 125 is disposed at an intersection of linear path (World, North America) of the row structure 120 and the linear path (Car, BMW®) of the column structure 121. The cell 126 is disposed at an intersection of linear path (World, Asia) of the row structure 120 and the linear path (Car, BMW®) of the column structure 121.

In FIG. 3B, the drilldown icon 127 may be selected to drill down the row structure 120 to a next level downward, the rollup icon 128 may be selected to roll up the row structure 120 one level upward, and the rollup icon 129 may be selected to roll up the column structure 121 one level upward. If in FIG. 3B, the rollup icons 128 and 129 were both selected, then FIG. 2B would result. If in FIG. 3B the drilldown icon 127 is selected, then the row structure 120 is drilled down to a third level that adds US, Canada, India, China as shown in FIG. 4B.

FIG. 4B depicts the row structure 130, the column structure 121, and the array structure 131. The row structure 130 comprises the four linear branches of: (World, North America, US), (World, North America, Canada), (World, Asia, India), and (World, Asia, China). The column structure 122 comprises the two linear branches (Car, HONDA®) and (Car, BMW®). The array structure 131 comprises 8 cells 133-40, each such cell being an empty cell with the assignment operator therein, said 8 cells 133-40 being disposed at the intersections of the four linear branches of the row structure 130 and the two linear branches of the column structure 121.

If in FIG. 3B the assignment icon in cell 123 is selected (e.g., by a user), then the flat vector 113 of FIG. 1B is displayed, as shown in FIG. 5B, for the purpose of assigning a data item to cell 123. The data item may be selected from: Male, Female, and Family Usage. If Family Usage is selected, then Family Usage is inserted into cell 123 of FIG. 3B resulting in FIG. 6B, wherein the data item Family Usage appears in cell 123 of FIG. 6B. An assignment icon also appears in cell 123 of FIG. 6B, because a user may select this assignment icon to change the data item in cell 123 to another data item (i.e., to Male or Female). Note that the assignment of data item Family Usage to cell 123 in FIG. 3B occurs at a row level 2 (i.e., at North America) and at a column level 2 (i.e, at HONDA®).

Similarly, the user may select assignment icons 137 and 138 of FIG. 4B for subsequently selecting Male and Female from the display of the flat vector 113 of FIG. 5B for insertion into cell 137 and 138, respectively, as shown in FIG. 7B. The assignment of data item Male to cell 137 occurs at a row level 3 (i.e., at China) and at a column level 2 (i.e, at BMW®). The assignment of data item Female to cell 138 occurs at a row level 3 (i.e., at India) and at a column level 2 (i.e, at BMW®). Cells 137 and 138 in FIG. 7B each comprise an assignment icon for replacing Male and Female, respectively, with other data values selected from Male, Female, and Family Usage.

If in FIG. 7B, the rollup icon 128 is selected, then the row structure 130 will be rolled up to the next level 2 showing the row structure 120 in FIG. 8B. Note that the data items Male and Female in cells 137 and 138, respectively, of FIG. 7B appear together as a data item Male, Female in cell 126 of FIG. 8B together with a lock icon 142. The lock icon 142 denotes that cell 126 is "locked", meaning that the data items Male, Female therein cannot be changed because the data items Male, Female were assigned in a lower level in cells 137 and 138 of FIG. 7B (i.e., in row level 3 as explained supra). The lock icon 142 resulting from the rollup to FIG. 8B from FIG. 7B is in recognition of the fact that the assignment of Male and Female at the lower level creates an ambiguity in the display of FIG. 8B as to the specific cells (i.e., cells 137 and 138) in which the data items Male and Female are located, because lower level cells 137 and 138 do not appear in FIG. 8B. Thus the lock 142 prevents reassignment of the data items in cell 126 in FIG. 8B. A cell having a lock icon therein, or a data item having a lock icon adjacent thereto, is said to be "locked". Thus in FIG. 8B cell 126 and data items Male, Female are locked.

The row structure 120 in FIG. 8B may be drilled down by selecting the drilldown icon 127 (e.g., by left-clicking a mouse on the drilldown icon 127), resulting in the orthogonal data structure of FIG. 7B in which the lock icon 142 does not appear.

If in FIG. 8B the rollup icon 129 is selected, then the column structure 121 will be rolled up to the next level (1) in which only Car appears in the column structure, as shown in FIG. 9B. FIG. 9B also shows a lock icon 143 in the cell 146, so that the data item Family Usage therein cannot be changed, because the data item Family Usage was assigned in a lower level (i.e., in column level 2) in cell 123 of FIG. 6B.

If in FIG. 9B the rollup icon 128 is selected, then the row structure 120 will be rolled-up to the next level (1) in which only World appears in the row structure, as shown in FIG. 10B. FIG. 10B also shows a lock icon 144 in the cell 147, so that the data item Family Usage therein cannot be changed because the data item Family Usage was assigned in a lower level (i.e., row level 3) in cell 123 of FIG. 6B.

If in FIG. 10B the rollup icon 129 is selected, then the column structure 121 will be rolled up to the next level (1) in which only Car appears in the column structure, as shown in FIG. 11B. FIG. 11B also shows a lock icon 145 in the cell 148, so that the data item Family Usage, Male, Female therein cannot be changed because Family Usage and Male and Female of the data item Family Usage, Male, Female were each assigned in a lower level as explained supra.

Figures 15B, 16B, 17B:
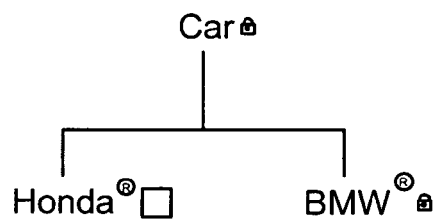

FIGS. 12B-17B show orthogonal data structures in which the row structure is the flat vector 113 of FIG. 1B. In FIGS. 12B-13B, the column structure is the second hierarchy 112 of FIG. 1B, and the array structure is the first hierarchy 111 of FIG. 1B. In FIGS. 14B, 15B, and 17B, the column structure is the first hierarchy 111 of FIG. 1B, and the array structure is the second hierarchy 112 of FIG. 1B. Since the vector 113 is a flat vector and not a hierarchy, there is no drilling down or rolling up in the row structure of FIGS. 12B-17B. However, drilling down and/or rolling up may occur in the column structure of FIGS. 12B-17B.

In FIG. 12B, the row structure 150 comprises the flat vector 113 (Male, Female, Family Usage), the column structure 151 comprises the data item Car, and the array structure 152 comprises the data items China, India, and North America in cells 153, 154, and 155 at the intersection of Car with Male, Female, and Family Usage, respectively. Cells 153-55 are each locked, because the data items China, India, and North America were respectively coupled to Male, Female, and Family Usage at a lower level as explained supra in conjunction with a transition from FIG. 3B to FIG. 6B for Family Usage, and a transition from FIG. 4B to FIG. 7B for Male, Female.

If the drilldown icon 158 in FIG. 12B is selected, then the column structure 151 is drilled down to column level 2 (HONDA®, BMW®), which is shown as column structure 156 in FIG. 13B. If the rollup icon 159 in FIG. 13B is selected, then a rollup of the column structure 156 results in FIG. 12B. The lock icons in cells 153-55 of FIG. 12B do not appear in FIG. 13B, because in FIG. 13B the data items China, India, and North America are at the level in which they were defined and are therefore placed in the same cell in which they were initially placed.

In FIG. 14B, the row structure 150 comprises the flat vector 113 (Male, Female, Family Usage), the column structure 161 comprises the data item World, and the array structure 162 comprises the data items BMW®, BMW®, and HONDA® in cells 163, 164, and 165 at the intersection of World with Male, Female, and Family Usage, respectively. Cells 163-65 are each locked, because the data items Car, BMW®, and HONDA® were respectively coupled to Male, Female, and Family Usage at a lower level as explained supra in conjunction with a transition from FIG. 3B to FIG. 6B for Family Usage, and a transition from FIG. 4B to FIG. 7B for Male, Female.

If the drilldown icon 168 in FIG. 14B is selected, then the column structure 161 is drilled down to column level 2 (North America, Asia), which is shown as column structure 166 in FIG. 15B. If the rollup icon 169 in FIG. 15B is selected, then a rollup of the column structure 166 results in FIG. 14B.

If any assignment icon in FIG. 15B is selected, then the second hierarchy 112 (i.e., linear paths Car, HONDA® and Car, BMW®) is displayed as shown in FIG. 16B. In FIG. 16B, HONDA® is locked because an assignment of HONDA® to the intersection of (Male and North America), (Female and North America), or (Family Usage and Asia) is inconsistent with the assignments of Family Usage to the intersection of North America and HONDA® in FIG. 8B. In FIG. 16B, Car is locked because there is an assignment of a level below Car, namely BMW® as shown in FIG. 15B.

If the drilldown icon 168 in FIG. 15B is selected, then the column structure 166 is drilled down to column structure 170 shown in FIG. 17B. The lock icons appearing in FIG. 15B do not appear in FIG. 17B, because in FIG. 17B the data item BMW® is at a level in which Male and Female were initially defined in FIG. 7B at the intersection of (China and BMW®) and (India and BMW®), respectively.

General Description of the Present Invention

The general description of the present invention includes all of the features described supra, and further includes extensions and generalizations of said features as described next.

The present invention discloses orthogonal table structures which processes non-numeric data items and perform rollup of these non-numeric data items. The non-numeric data items may appear in the orthogonal table structure as a row structure, a column structure, and an array structure.

FIG. 18 is a flow chart comprising steps 71-73, wherein the flow chart describes a method for displaying hierarchical data in accordance with embodiments of the present invention.

Step 71 provides entities E1, E2, and E3. E1 is a first hierarchy of linked data items, E2 is a second hierarchy of linked data items, and E3 is a third hierarchy of linked data items or is a flat vector of data items. The data items in E1, E2, and E3 are non-numeric data items.

In step 72, T1, T2, and T3 are each selected from E1, E2, and E3 such that T1, T2, and T3 are different from one another.

Step 73 displays an orthogonal table structure comprising a row structure S1, a column structure S2, and an array structure S3. S1 is derived from T1, S2 is derived from T2, and S3 is derived from S3 or is unassigned. A read/write mode or a read-only mode may be assigned to the table structure displayed in step 73;

S3 may comprise a cell that is assigned, assignable, or both assigned and assignable. If the cell is assignable, then the cell may comprise an assignment icon. The assignment icon in the cell generates a display of the data items of T3 so that one of the displayed data items of T3 may be subsequently selected for insertion into the cell.

S3 may comprise a locked cell and the locked cell may comprise a lock icon.

S1 or S2 may comprise a drilldown icon, wherein the drilldown icon is selectable for drilling down S1 or S2, respectively.

S1 or S2 may comprise a rollup icon, wherein the rollup icon is selectable for rolling up S1 or S2, respectively.

S3 may comprise a first cell and a second cell respectively having a first data item and a second data item therein, wherein S1 or S2 may be rolled up to form a modified orthogonal table structure comprising an array structure that includes a locked cell having the first data item and the second data item therein.

Figure 19:
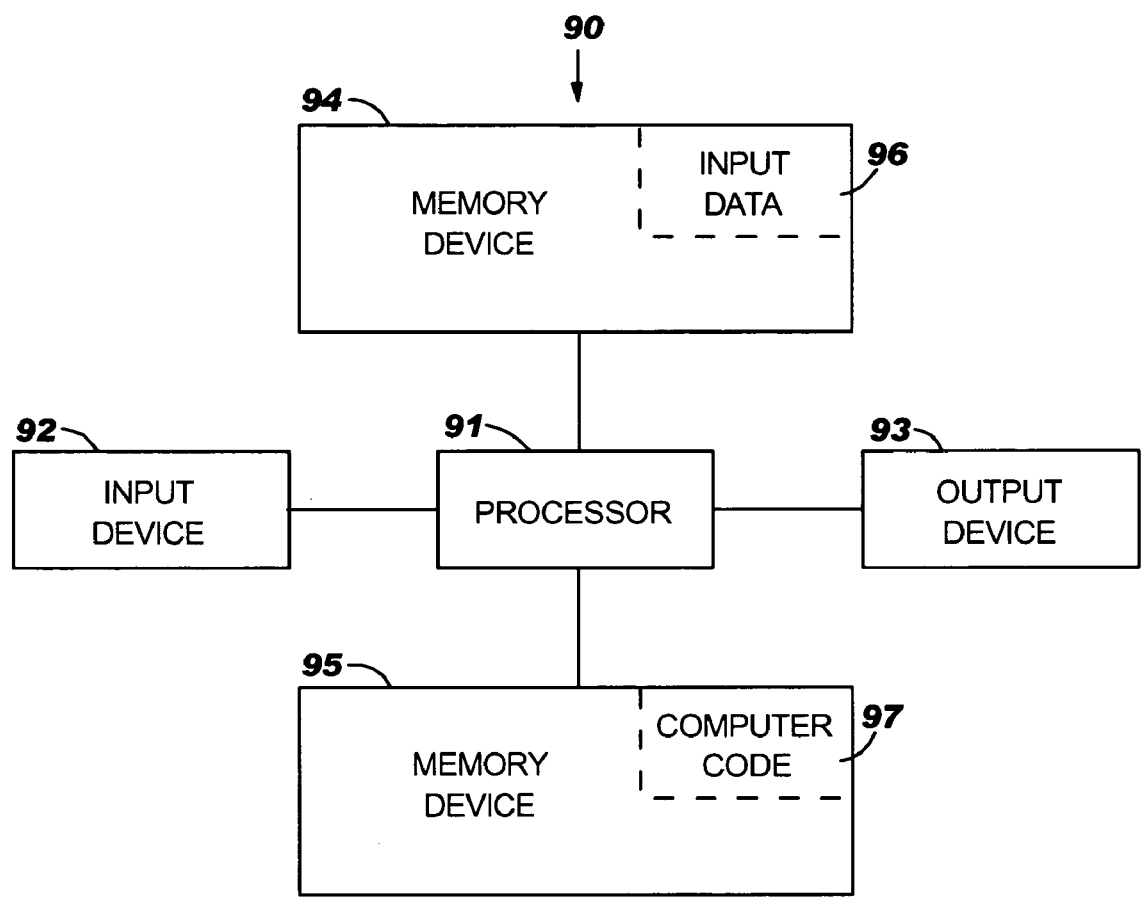
FIG. 19 illustrates a computer system used for displaying hierarchical data, in accordance with embodiments of the present invention.

FIG. 19 illustrates a computer system 90 used for displaying hierarchical data, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for displaying hierarchical data. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 19) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 19 shows the computer system 90 as a particular configuration of hardware and software, any configuration of hardware and software, as would be known to a person of ordinary skill in the art, may be utilized for the purposes stated supra in conjunction with the particular computer system 90 of FIG. 19. For example, the memory devices 94 and 95 may be portions of a single memory device rather than separate memory devices.

The computer system 90 may be a web-based server system accessed by a client (e.g., over the Internet) such that the client may display and/or modify the hierarchical data (i.e., the orthogonal data structures) of the present invention.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for displaying hierarchical data, comprising:
providing entities E1, E2, and E3, E1 being a first hierarchy of linked data items, E2 being a second hierarchy of linked data items, and E3 being a third hierarchy of linked data items or a flat vector of data items, said data items in E1, E2, and E3 being non-numeric data items;

selecting T1, T2, and T3 each from the group consisting of E1, E2, and E3 such that T1, T2, and T3 are different from one another; and displaying an orthogonal table structure comprising a row structure S1, a column structure S2, and an array structure S3, wherein S1 comprises at least two hierarchical levels of T1;

wherein S2 comprises at least two hierarchical levels of T2;

wherein S3 is an array of cells such that every combination of a linear path through S1 and a linear path through S2 has an intersection disposed in the orthogonal table structure at a unique cell of S3 such that the unique cell of S3 contains or is adapted to contain a measure or value of said combination of said linear path through S1 and said linear path through S2;

wherein an assignment icon is depicted in the orthogonal table structure at each cell of S3 such that selection of the assignment icon at each cell results in displaying the data items of T3 such that a user may select one of the displayed data items of T3 to insert in said each cell if said each cell is empty or to replace an existing data item in said each cell;

wherein the orthogonal table structure further comprises a drilldown icon for S1 such that selection of the drilldown icon for S1 results in S1 being changed in the orthogonal table structure to include the next lower hierarchical level of S1 and further results in S3 being changed such that every combination of a linear path through the changed S1 and a linear path through S2 has an intersection disposed in the orthogonal table structure at a unique cell of S3;

wherein the orthogonal table structure further comprises a drilldown icon for S2 such that selection of the drilldown icon for S2 results in S2 being changed in the orthogonal table structure to include the next lower hierarchical level of S2 and further results in S3 being changed such that every combination of a linear path through S1 and a linear path through the changed S2 has an intersection disposed in the orthogonal table structure at a unique cell of S3;

wherein the orthogonal table structure further comprises a rollup icon for S1 such that selection of the rollup icon for S1 results in S1 being changed in the orthogonal table structure to delete the lowest hierarchical level of S1 and further results in S3 being changed such that every combination of a linear path through the rolled up S1 and a linear path through S2 has an intersection disposed in the orthogonal table structure at a unique cell of S3;

wherein the orthogonal table structure further comprises a rollup icon for S2 such that selection of the rollup icon for S2 results in S2 being changed in the orthogonal table structure to delete the lowest hierarchical level of S2 and further results in S3 being changed such that every combination of a linear path through S1 and a linear path through the rolled up S2 has an intersection disposed in the orthogonal table structure at a unique cell of S3; and wherein the method further comprises in the order recited:

responsive to selection of the drilldown icon for S1, changing the displayed orthogonal table structure to include the next lower hierarchical level of S1;

responsive to selection of the assignment icon for two cells of S3 corresponding to the next lower hierarchical level of S1 and to subsequent selection of two data items from T3, changing the displayed orthogonal table structure to display the two data items from T3 in the two cells of S3 at the next lower hierarchical level of S1;

responsive to selection of the rollup icon for S1, changing the displayed orthogonal table structure to delete said displayed next lower hierarchical level of S1 and displaying the two data items from T3 in cells of S3 at the lowest displayed level of S1 together with a lock icon denoting that the two data items from T3 in cells of S3 at the lowest displayed level of S1 cannot be changed; and responsive to selection of the drilldown icon for S1, changing the displayed orthogonal table structure to include the next lower hierarchical level of S1, resulting in the two data items from T3 being displayed in the next lower hierarchical level of S1 without the lock icon.

2. A computer system comprising a processor and a computer readable memory unit coupled to the processor, said memory unit containing instructions that when executed by the processor implement a method for displaying hierarchical data, said method comprising the computer implemented steps of:

selecting T1, T2, and T3 each from the group consisting of E1, E2, and E3 such that T1, T2, and T3 are different from one another, said E1 being a first hierarchy of linked data items, said E2 being a second hierarchy of linked data items, said E3 being a third hierarchy of linked data items or a flat vector of data items, said data items in E1, E2, and E3 being non-numeric data items; and displaying an orthogonal table structure comprising a row structure S1, a column structure S2, and an array structure S3, wherein S1 comprises at least two hierarchical levels of T1;

wherein S2 comprises at least two hierarchical levels of T2;

wherein S3 is an array of cells such that every combination of a linear path though S1 and a linear path though S2 has an intersection disposed in the orthogonal table structure at a unique cell of S3 such that the unique cell of S3 contains or is adapted to contain a measure or value of said combination of said linear path through S1 and said linear path though S2;

wherein an assignment icon is depicted in the orthogonal table structure at each cell of S3 such that selection of the assignment icon at each cell results in displaying the data items of T3 such that a user may select one of the displayed data items of T3 to insert in said each cell if said each cell is empty or to replace an existing data item in said each cell;

wherein the orthogonal table structure further comprises a drilldown icon for S1 such that selection of the drilldown icon for S1 results in S1 being changed in the orthogonal table structure to include the next lower hierarchical level of S1 and further results in S3 being changed such that every combination of a linear path through the changed S1 and a linear path through S2 has an intersection disposed in the orthogonal table structure at a unique cell of S3;

wherein the orthogonal table structure further comprises a drilldown icon for S2 such that selection of the drilldown icon for S2 results in S2 being changed in the orthogonal table structure to include the next lower hierarchical level of S2 and further results in S3 being changed such that every combination of a linear path through S1 and a linear path though the changed S2 has an intersection disposed in the orthogonal table structure at a unique cell of S3;

wherein the orthogonal table structure further comprises a rollup icon for S1 such that selection of the rollup icon for S1 results in S1 being changed in the orthogonal table structure to delete the lowest hierarchical level of S1 and further results in S3 being changed such that every combination of a linear path through the rolled up S1 and a linear path through S2 has an intersection disposed in the orthogonal table structure at a unique cell of S3;

wherein the orthogonal table structure further comprises a rollup icon for S2 such that selection of the rollup icon for S2 results in S2 being changed in the orthogonal table structure to delete the lowest hierarchical level of S2 and further results in S3 being changed such that every combination of a linear path though S1 and a linear path through the rolled up S2 has an intersection disposed in the orthogonal table structure at a unique cell of S3; and wherein the method further comprises in the order recited:

responsive to selection of the drilldown icon for S1, changing the displayed orthogonal table structure to include the next lower hierarchical level of S1;

responsive to selection of the assignment icon for two cells of S3 corresponding to the next lower hierarchical level of S1 and to subsequent selection of two data items from T3, changing the displayed orthogonal table structure to display the two data items from T3 in the two cells of S3 at the next lower hierarchical level of S1;

responsive to selection of the rollup icon for S1, changing the displayed orthogonal table structure to delete said displayed next lower hierarchical level of S1 and displaying the two data items from T3 in cells of S3 at the lowest displayed level of S1 together with a lock icon denoting that the two data items from T3 in cells of S3 at the lowest displayed level of S1 cannot be changed; and responsive to selection of the drilldown icon for S1, changing the displayed orthogonal table structure to include the next lower hierarchical level of S1, resulting in the two data items from T3 being displayed in the next lower hierarchical level of S1 without the lock icon.

3. A computer program product, comprising a computer usable medium having a computer readable program code embodied therein, said computer readable program code comprising an algorithm adapted to implement a method for displaying hierarchical data, said method comprising the steps of:

selecting T1, T2, and T3 each from the group consisting of E1, E2, and E3 such that T1, T2, and T3 are different from one another, said E1 being a first hierarchy of linked data items, said E2 being a second hierarchy of linked data items, said E3 being a third hierarchy of linked data items or a flat vector of data items, said data items in E1, E2, and E3 being non-numeric data items; and displaying an orthogonal table structure comprising a row structure S1, a column structure S2, and an array structure S3, said S1 being derived from T1, wherein S1 comprises at least two hierarchical levels of T1;

wherein S2 comprises at least two hierarchical levels of T2;

wherein S3 is an array of cells such that every combination of a linear path through S1 and a linear path through S2 has an intersection disposed in the orthogonal table structure at a unique cell of S3 such that the unique cell of S3 contains or is adapted to contain a measure or value of said combination of said linear path through S1 and said linear path through S2;

wherein an assignment icon is depicted in the orthogonal table structure at each cell of S3 such that selection of the assignment icon at each cell results in displaying the data items of T3 such that a user may select one of the displayed data items of T3 to insert in said each cell if said each cell is empty or to replace an existing data item in said each cell;

wherein the orthogonal table structure further comprises a drilldown icon for S1 such that selection of the drilldown icon for S1 results in S1 being changed in the orthogonal table structure to include the next lower hierarchical level of S1 and further results in S3 being changed such that every combination of a linear path through the changed S1 and a linear path through S2 has an intersection disposed in the orthogonal table structure at a unique cell of S3;

wherein the orthogonal table structure further comprises a drilldown icon for S2 such that selection of the drilldown icon for S2 results in S2 being changed in the orthogonal table structure to include the next lower hierarchical level of S2 and further results in S3 being changed such that every combination of a linear path through S1 and a linear path through the changed S2 has an intersection disposed in the orthogonal table structure at a unique cell of S3;

wherein the orthogonal table structure further comprises a rollup icon for S1 such that selection of the rollup icon for S1 results in S1 being changed in the orthogonal table structure to delete the lowest hierarchical level of S1 and further results in S3 being changed such that every combination of a linear path through the rolled up S1 and a linear path through S2 has an intersection disposed in the orthogonal table structure at a unique cell of S3;

wherein the orthogonal table structure further comprises a rollup icon for S2 such that selection of the rollup icon for S2 results in S2 being changed in the orthogonal table structure to delete the lowest hierarchical level of S2 and further results in S3 being changed such that every combination of a linear path through S1 and a linear path through the rolled up S2 has an intersection disposed in the orthogonal table structure at a unique cell of S3; and wherein the method further comprises in the order recited:

responsive to selection of the drilldown icon for S1, changing the displayed orthogonal table structure to include the next lower hierarchical level of S1;

responsive to selection of the assignment icon for two cells of S3 corresponding to the next lower hierarchical level of S1 and to subsequent selection of two data items from T3, changing the displayed orthogonal table structure to display the two data items from T3 in the two cells of S3 at the next lower hierarchical level of S1;

responsive to selection of the rollup icon for S1, changing the displayed orthogonal table structure to delete said displayed next lower hierarchical level of S1 and displaying the two data items from T3 in cells of S3 at the lowest displayed level of S1 together with a lock icon denoting that the two data items from T3 in cells of S3 at the lowest displayed level of S1 cannot be changed; and responsive to selection of the drilldown icon for S1, changing the displayed orthogonal table structure to include the next lower hierarchical level of S1, resulting in the two data items from T3 being displayed in the next lower hierarchical level of S1 without the lock icon.

* * * * *